(12) United States Patent
Hu et al.

(10) Patent No.: US 9,075,299 B2
(45) Date of Patent: Jul. 7, 2015

(54) LIGHT SOURCE WITH WAVELENGTH CONVERSION DEVICE AND FILTER PLATE

(75) Inventors: Fei Hu, Shen Zhen (CN); Yi Li, Pleasanton, CA (US)

(73) Assignee: APPOTRONICS CORPORATION LIMITED, Shenzhen (CN)

(*) Notice: Subject to any disclaimer, the term of this patent is extended or adjusted under 35 U.S.C. 154(b) by 151 days.

(21) Appl. No.: 13/595,752

(22) Filed: Aug. 27, 2012

(65) Prior Publication Data

US 2013/0229634 A1     Sep. 5, 2013

Related U.S. Application Data (60) Provisional application No. 61/528,218, filed on Aug. 27, 2011.

(51) Int. Cl.

| | |
|---|---|
| G03B 21/20 | (2006.01) |
| H04N 9/31 | (2006.01) |
| F21V 9/16 | (2006.01) |
| F21W 131/406 | (2006.01) |
| F21V 7/22 | (2006.01) |

(52) U.S. Cl.
CPC ............... G03B 21/204 (2013.01); *F21V 9/16* (2013.01); H04N 9/3158 (2013.01); *H04N 9/3161* (2013.01); *F21W 2131/406* (2013.01); *F21V 7/22* (2013.01)

(58) Field of Classification Search
CPC ............. G03B 21/20; G03B 21/2006; G03B 21/2033; G03B 21/204; G03B 21/206; G03B 21/2093; H04N 9/31; H04N 9/315; H04N 9/3158; H04N 9/3191; H04N 9/3182

USPC ............ 353/30–31, 33, 84–85, 94, 121–122; 359/885, 889, 891–892; 362/84

See application file for complete search history.

(56) References Cited

U.S. PATENT DOCUMENTS

| | | | |
|---|---|---|---|
| 6,874,893 B2 * | 4/2005 | Park ................................ 353/84 |
| 7,070,300 B2 * | 7/2006 | Harbers et al. ................ 362/231 |
| 7,357,513 B2 * | 4/2008 | Watson et al. .................. 353/31 |
| 7,547,114 B2 * | 6/2009 | Li et al. .......................... 362/231 |
| 8,157,398 B2 * | 4/2012 | Yamamoto ...................... 362/84 |
| 8,167,440 B2 * | 5/2012 | Sato et al. ........................ 353/99 |
| 8,403,492 B2 * | 3/2013 | Shibasaki ........................ 353/31 |
| 8,469,520 B2 * | 6/2013 | Maeda ............................ 353/31 |
| 8,474,997 B2 * | 7/2013 | Li et al. .......................... 362/243 |
| 8,523,367 B2 * | 9/2013 | Ogura ............................. 353/84 |
| 8,562,141 B2 * | 10/2013 | Ogino ............................ 353/38 |
| 8,562,146 B2 * | 10/2013 | Kitano et al. ................... 353/84 |
| 8,616,710 B2 * | 12/2013 | Fukano ........................... 353/85 |

(Continued)

*Primary Examiner* — Jori S Reilly-Diakun
(74) *Attorney, Agent, or Firm* — Chen Yoshimura LLP (57) ABSTRACT

A light source device uses a wavelength down conversion material for absorbing an excitation light and generating a converted light, and a color filter for filtering the converted light to generate a different color light as output. The wavelength conversion material is a yellow or green phosphor which absorbs blue or UV light and generates a yellow or green converted light, which has a sufficiently wide spectrum to cover some of the red color region. The color filter only allows the red component of the converted light to be output. This system is more energy efficient than using a red phosphor. This light source may be implemented as a moving phosphor wheel having multiple segments, one of which being the yellow or green phosphor with the corresponding color filter, the other segments being used to generate other colored lights such as green and blue lights.

20 Claims, 4 Drawing Sheets

(56) References Cited

U.S. PATENT DOCUMENTS

| | | | |
|---|---|---|---|
| 8,632,197 B2* | 1/2014 | Chang | 362/84 |
| 2007/0053184 A1* | 3/2007 | Brukilacchio | 362/231 |
| 2008/0158873 A1* | 7/2008 | Bierhuizen et al. | 362/230 |
| 2009/0034284 A1* | 2/2009 | Li et al. | 362/554 |
| 2010/0149496 A1* | 6/2010 | Inoue | 353/98 |
| 2010/0245777 A1* | 9/2010 | Ogura | 353/38 |
| 2010/0328554 A1* | 12/2010 | Shibasaki | 348/760 |
| 2010/0328625 A1* | 12/2010 | Miyazaki et al. | 353/85 |
| 2010/0328627 A1* | 12/2010 | Miyazaki | 353/85 |
| 2010/0328628 A1* | 12/2010 | Masuda | 353/85 |
| 2010/0328632 A1* | 12/2010 | Kurosaki et al. | 353/98 |
| 2011/0043765 A1* | 2/2011 | Shibasaki | 353/31 |
| 2011/0051102 A1* | 3/2011 | Ogura et al. | 353/85 |
| 2011/0063581 A1* | 3/2011 | Iwanaga | 353/31 |
| 2011/0075106 A1* | 3/2011 | Shibasaki | 353/31 |
| 2011/0317131 A1* | 12/2011 | Miyazaki | 353/31 |
| 2012/0140185 A1* | 6/2012 | Masuda | 353/31 |
| 2013/0100420 A1* | 4/2013 | Ferri et al. | 353/31 |
| 2013/0100644 A1* | 4/2013 | Hu et al. | 362/84 |
| 2013/0163224 A1* | 6/2013 | Chang | 362/84 |
| 2014/0092581 A1* | 4/2014 | Berben | 362/84 |

* cited by examiner

LIGHT SOURCE WITH WAVELENGTH CONVERSION DEVICE AND FILTER PLATE

This application claims priority under 35 USC §119(e) from U.S. Provisional Patent Application No. 61/528,218, filed Aug. 27, 2011, which is herein incorporated by reference in its entirety.

BACKGROUND OF THE INVENTION

1. Field of the Invention

The present invention is in the technical field of light sources, and more particularly, light sources useful in applications that requires high luminance, such as projection displays and stage lighting.

2. Description of the Related Art

Figure 1:
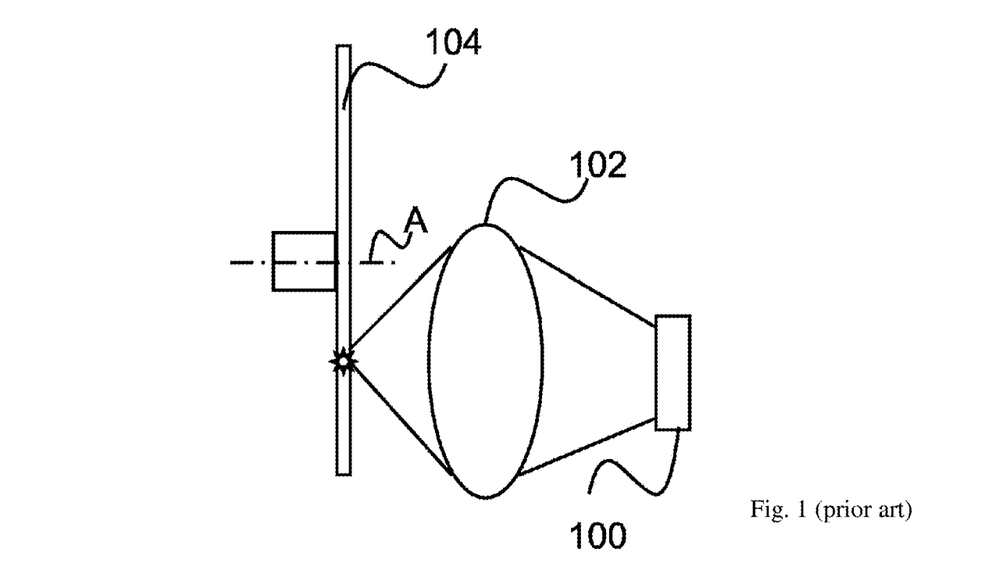
FIG. 1 shows a solid state light source structure (prior art).

Many applications need colored light, such as stage lighting, projection display, RGB backlighting etc. Conventional high luminance light sources used in special lighting and displays are gas discharge lamps. An environmental-friendly technology is described in U.S. Pat. No. 7,547,114. In this light source structure, shown in FIG. 1, a solid-state light source 100 is used to emit an excitation light through a focusing system 102, and a rotation phosphor wheel 104, in which several color phosphors are coated in different segments, is excited by the excitation light source to generate a light with a colored light sequence. A is the rotation axis of the color wheel. Phosphor materials are wavelength down conversion materials, which means that they can absorb shorter wavelength photons and emit longer wavelength photons. Other wavelength down conversion materials useful in the above device include quantum dots, etc.

In the prior art described by U.S. Pat. No. 7,547,114, the multiple colors are generated sequentially. When the phosphor wheel's red phosphor segment is moved to the excitation position, red phosphor will be excited and red color light will be generated. The same thing happens for a green phosphor segment or a yellow phosphor segment.

SUMMARY OF THE INVENTION

After studying properties of red phosphors, green phosphor sand yellow phosphors, the inventors of this invention discovered some disadvantages of using red phosphors to generate red color light, as discussed below.

The color of a light can be described in terms of its dominant wavelength. In a CIE (International Commission on Illumination) 1931 color space chromaticity diagram, the dominant wavelength of a color located within the color space boundary (the monochromatic locus) is the intersection of the monochromatic locus curve and a straight line connecting a point representing white and the point representing the subject color. A red phosphor typically refers to a phosphor whose emission has a dominant wavelength between 590 nm and 780 nm. A green phosphor typically refers to a phosphor whose emission has a dominant wavelength between 520 nm and 570 nm. A yellow phosphor typically refers to a phosphor whose emission has a dominant wavelength between 570 nm and 590 nm. Usually red phosphors need to absorb UV or blue photons and emit red photons. Therefore compared with green phosphors and yellow phosphors, red phosphors have larger Stokes shift loss. The Stokes shift loss will turn into heat and raise the working temperature of red phosphors, which will further decrease their quantum efficiency. Phosphor's conversion efficiency is defined as the emission's radiant power divided by the excitation radiant power. Red phosphors usually have much lower conversion efficiencies than green and yellow phosphors.

Figure 2:
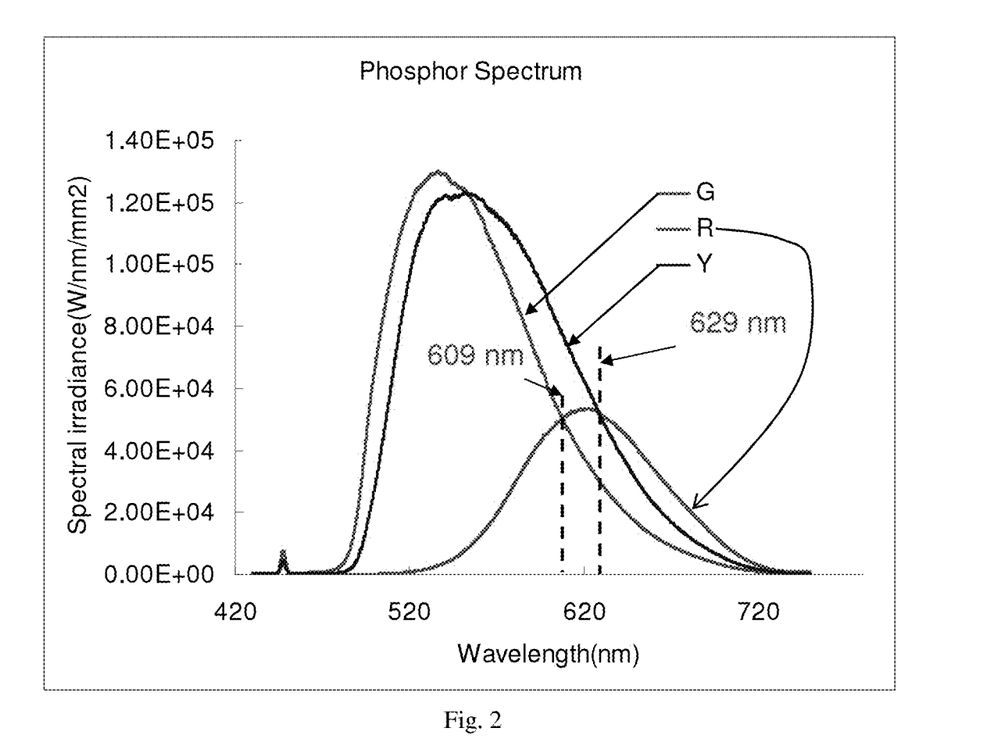
FIG. 2 shows the absolute spectra of a red phosphor, a green phosphor, and a yellow phosphor.

As seen in FIG. 2, absolute spectra of three typical phosphors including a red phosphor, a green phosphor and a yellow phosphor are shown in the same graph. It is clear in the graph that the red phosphor has much lower peak spectral irradiance than the other two phosphors, and also the radiant power of the red phosphor is much smaller than the other two. The red phosphor's spectrum intersects the yellow phosphor's spectrum at wavelength around 629 nm, and intersects the green phosphor's spectrum at wavelength 609 nm.

If an ideal optical filter is used that can reject light that has shorter wavelengths than 590 nm, and only accept light that has longer wavelengths than 590 nm, the remaining radiant power of the three phosphors can be calculated as shown in table 1 below:

TABLE 1

Radiant power of red portion based on the calculation of phosphor spectra

| | Yellow Phosphor | Green Phosphor | Red Phosphor |
|---|---|---|---|
| Radiant Power at Wavelength >590 nm | 4.67 W | 2.88 W | 4.28 W |

It can be seen that:

1. The green phosphor has much less radiant energy compared with the red and the yellow phosphor.

2. The red phosphor has less radiant power than the yellow phosphor.

What's more, the red phosphor has more radiant power at longer wavelength than 629 nm, where spectral luminous efficiency is lower than wavelength between 590 nm and 629 nm. So the final result is that the emission from the red phosphor is dimmer than the emission from the yellow phosphor.

In a test, dichroic filters were used to filter the emission from the red phosphor and the yellow phosphor. The two phosphor's emission lights were both collected and reached corresponding filters at angle of incidence between 0 and 30 degrees. After the filters, the emission from the two phosphors have similar color coordinates (x=0.64, y=0.35). The measured data showed that the yellow phosphor can deliver 30% to 40% more luminous flux.

As a result of the above analysis, the inventors determined that using a yellow phosphor together with a color filter can deliver a red light with more luminous flux than using a red phosphor. The yellow phosphor has a dominant wavelength shorter than 590 nm, but it has a broad spectrum that covers part of the red color region. One of the reasons of stronger red emission for a yellow phosphor is that it has much higher conversion efficiency. Besides stronger red emission, the usually used YAG:Ce yellow phosphor has several other advantages over red phosphors:

1. The yellow phosphor has less emission saturation effect, called drooping, when the excitation power is boosted up.

2. The yellow phosphor is less vulnerable to heat-induced reliability problems. For red phosphors, experiments shows that if a 34 W blue excitation light is used, only 4.22 W red light power is collected as useful emission, the other energy is mainly absorbed and converted to heat by the phosphor. The red phosphor has only 12.4% optical to optical efficiency. For the yellow phosphor mentioned above, the optical to optical efficiency is 47% under the same excitation conditions.

3. The yellow phosphor has less wavelength shifting when the phosphor's working temperature changes.

4. Red phosphors tend to be more expensive than yellow phosphors.

Usually Green phosphors also have much higher conversion efficiency than red phosphors, but their spectra need to have enough emission in the red color region in order to give a higher overall efficiency than red phosphors.

Embodiments of this invention use a moving plate carrying a broad band emission phosphor together with a color filter to generate red light. The broad band emission phosphor has a conversion efficiency higher than 15%. The broad band emission phosphor has an emission dominant wavelength shorter than 590 nm, but has emission in the wavelength range longer than 590 nm. The color filter is a device that can accept light in certain wavelength range but reject light in other wavelength ranges. The color filter can be an absorptive color filter or a dichroic filter.

In some existing technologies, a color filter is used to adjust the color of an output light, e.g., to enhance its saturation. However, in such existing technologies, the dominant wavelength of the light does not change significantly after the color filter, the typical change in dominant wavelength being less than 3 nm. In embodiments of the present invention, the dominance wavelength of the light emitted by the phosphor material is shifted by more than 3 nm, preferably more than 10 nm, by the color filter.

In various embodiments of this invention, the phosphor's emission light is generated from a moving phosphor device, which may be a rotating phosphor disk, a rotating phosphor drum, a linearly moving phosphor plate, etc. The reason for using a moving device is to lower the heat generation for individual phosphor particles. The movement of phosphor plate with respect to the excitation light effectively converts the phosphor working mode from a continuous wave mode to a pulse mode.

In a light source according to one embodiment of the present invention, the phosphor device is coated with a high efficiency yellow phosphor layer. A blue light is used as the excitation source. The emission from such a phosphor is collected into a collimated beam. A dichroic filter is used in the path of the collimated beam to accept red light only. The dichroic filter may be one that has high transmittance in a wavelength range longer than 590 nm and low transmittance in a wavelength range shorter than 590 nm. The light output from this light source is a red light. Compared with a light source that uses a red phosphor layer and no filter, the above light source using a yellow phosphor and a filter has higher luminous flux output and higher brightness. Such a red emitting device can be combined with other light emitting devices emitting green or blue colors, by using a color combiner, such as dichroic filters and dichroic cubes. The other light emitting devices may be green or blue LEDs, green or blue lasers, green moving phosphor device, etc.

In addition to phosphor materials, other wavelength down conversion materials useful in embodiments of the present invention include quantum dots, etc. For simplicity, here and in the following text phosphors are uses as an example but this invention covers all wavelengths down conversion materials. To achieve these and other advantages and in accordance with the purpose of the present invention, as embodied and broadly described, the present invention provides a light source device, which includes: an excitation light source for generating an excitation light; a wavelength conversion device carrying a first wavelength conversion material which converts the excitation light into a first color light having longer wavelengths than the excitation light; and a filter plate having a first filter segment which filters the first color light to output a second color light, wherein a difference between dominant wavelengths of the second color light and the first color light is more than 3 nm.

In another aspect, the present invention provides a light source system including the above light source device, and further includes: a second light source device; and a color combiner for combining an output of the second light source device with the second color light.

In another aspect, the present invention provides a projector system including the above light source device, and further includes: a spatial light modulator for modulating the light from the light source device; and projection optics for projecting the modulated light.

It is to be understood that both the foregoing general description and the following detailed description are exemplary and explanatory and are intended to provide further explanation of the invention as claimed.

DETAILED DESCRIPTION OF THE PREFERRED EMBODIMENTS

A light source device uses a wavelength down conversion material for absorbing an excitation light and generating a converted light, and a color filter for filtering the converted light to generate a different color light as output. The wavelength conversion material is a yellow or green phosphor which absorbs blue or UV light and generates a yellow or green converted light, which has a sufficiently wide spectrum to cover some of the red color region. The color filter only allows the red component of the converted light to be output. This system is more energy efficient than using a red phosphor. This light source may be implemented as a moving phosphor wheel having multiple segments, one of which being the yellow or green phosphor with the corresponding color filter, the other segments being used to generate other colored lights such as green and blue lights. Various embodiments are described in detail below.

Figure 3:
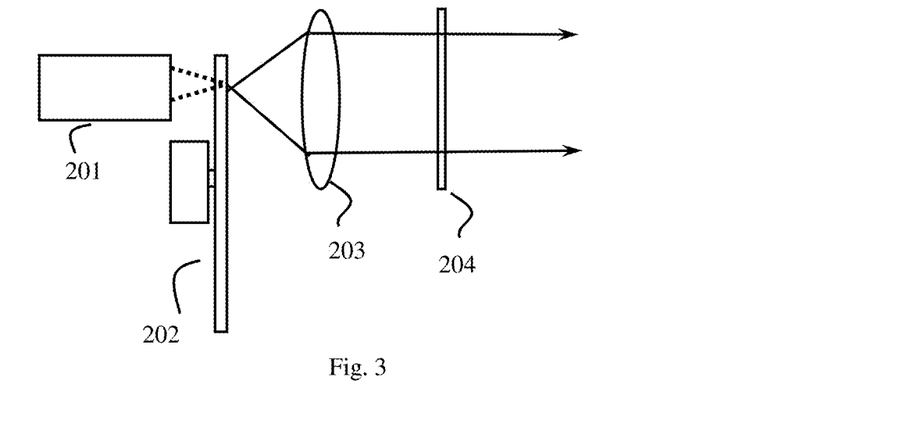
FIG. 3 shows a light source device according to an embodiment of the present invention.

FIG. 3 shows a light source device according to one embodiment of the present invention. The device includes an excitation light source 201, which may be a blue source or a UV/near UV source, a phosphor wheel 202 illuminated by the excitation light form the source 201, collection optics 203 for collecting light emitted by the phosphor wheel into a collimated beam, and a color filter 204. The color filter 204 may be an absorptive filter or a dichroic filter. Because dichroic filters have different transmittance spectrum at different angle of incidence, it is preferred to use the dichroic filter when the beam has a small divergence angle. In FIG. 3, the beam is collimated, so the emission light from the phosphor wheel can be efficiently filtered. If the filter is an absorption type filter or if the divergent angle of the light from the phosphor wheel 202 does not significantly impact the filtering function of the filter, the collection optics 203 may be omitted.

The phosphor carried on the phosphor wheel 202 may be a YAG:Ce phosphor which emits a yellow light, or other types of yellow and/or green phosphors. The dominant wavelength of the emitted light form YAG:Ce is 570 nm, shorter than 590 nm. After the color filter 204, the yellow light is filtered into a red light having a dominant wavelength larger than 590 nm.

Figure 4:
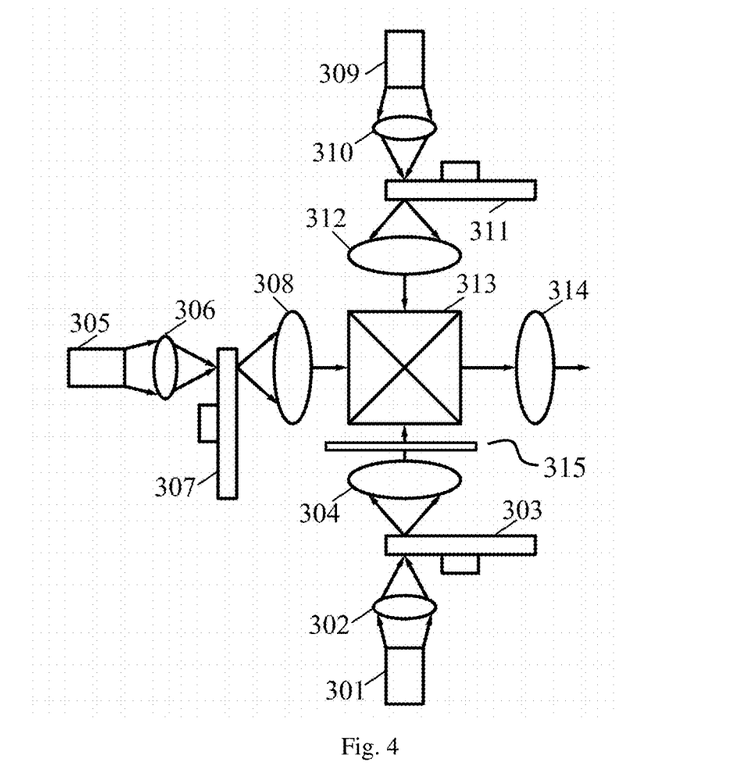
FIG. 4 shows a light source device according to another embodiment of the present invention.

The light source device shown in FIG. 3 may be used in combination with additional light source devices to generate a mixed light, as shown in FIG. 4. The device in FIG. 4 uses three colored light modules and a color combiner to obtain a mixed light. The red light module, including excitation light source 301, lens 302, phosphor wheel 303, lens 304, and filter 315 has a similar structure as the light source device of FIG. 3. The other two light modules include a green phosphor conversion module formed of components 305, 306, 307 and 308, and a blue phosphor conversion module formed of components 309, 310, 311 and 312. The other two colored light may also be provided directly from a light emitting device such as a LED device or a laser diode device.

Figure 5:
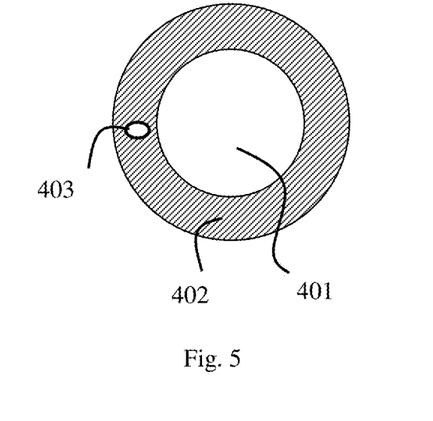
FIG. 5 shows the phosphor wheel used in the light source device of FIG. 3.

FIG. 5 shows the phosphor layer of the phosphor wheel 202 used in the light source device of FIG. 3. It includes a single segment phosphor layer 402 carried on a substrate 401, which may be a transparent (e.g. glass) material for a transmissive type phosphor wheel or a metal material with a high reflectance coating for a reflective type phosphor wheel. The excitation light illuminates a spot 403 on the phosphor wheel. As the phosphor wheel rotates, the light spot will illuminate different areas of the phosphor layer along a predetermined path. This avoids overheating of the phosphor material due to prolonged exposure at one spot.

Alternatively, the phosphor wheel 202 may have multiple segments carrying different phosphor materials, one of which being a yellow or green phosphor described above. The other phosphor segments may carry a different phosphor, or may be a clear segment (without any phosphor or filter) to pass the excitation light or a filter segment to filter the excitation light. The light from both segments are processed by the filter 204 (e.g. transmitted or reflected) and used subsequently for display or other purpose.

In other embodiments, the phosphor wheel may be replaced by a rotating cylinder, a linearly moving flat plate, or other shaped moving member carrying phosphor materials (not shown); the motor is designed accordingly to drive the motion of the moving member. These devices are more generally referred to as a moving wavelength conversion device.

Figure 6:
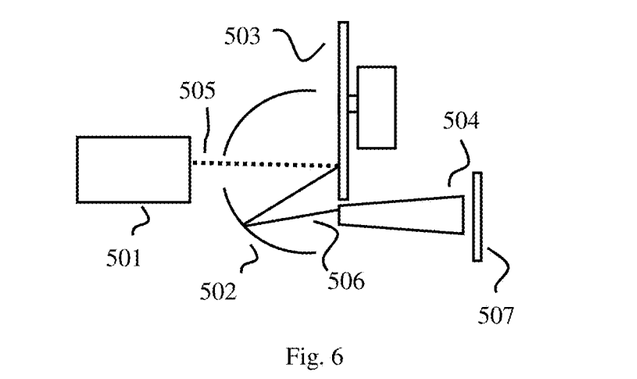
FIG. 6 shows a light source device according to another embodiment of the present invention.

A light source device according to another embodiment of the present invention is shown in FIG. 6, which employs a reflective type phosphor wheel 503. The phosphor wheel 503 has a substrate coated with a reflective material and carries a single-segment phosphor layer similar to that shown in FIG. 5. The phosphor material includes a yellow and/or green phosphor. The light 505 from the excitation light source 501 passes through an aperture of a reflector (spherical or ellipsoidal reflector) 502 to illuminate the phosphor wheel 503. The light 506 emitted by the phosphor material is reflected by the reflective coating of the phosphor wheel 503 and relayed by the reflector 502 to the entrance of collection optics 504. The collection optics 504 may be a tapered light tunnel, a tapered light rod, or a lens group. While the emission from the phosphor wheel 503 has a near Lambertian distribution, the emission light has a smaller beam divergence such as +−30 degrees after the collection optics 504. At the output of the collection optics 504, a color filter 507 is provided to change the color of the output light to red.

Figure 7:
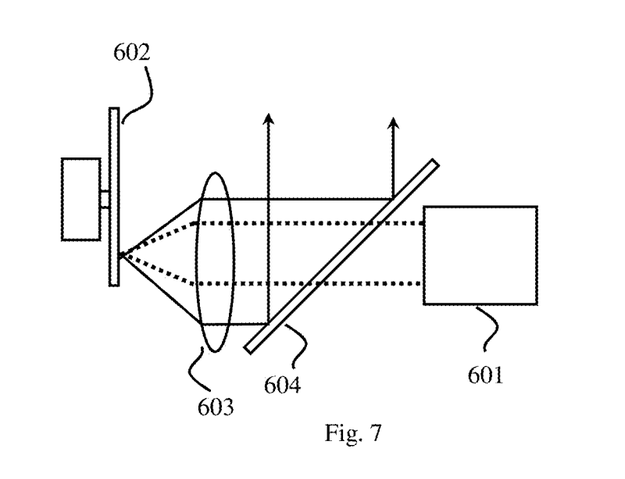
FIG. 7 shows a light source device according to another embodiment of the present invention.

A light source according to another embodiment of the present invention is shown in FIG. 7, which also uses a reflective type design. This device includes a blue or UV/near UV excitation source 601, a dichroic filter 604, collection optics 603, and a reflective type phosphor wheel 602 carrying a yellow and/or green phosphor material. The excitation light from the source 601 passes through the dichroic filter 604 and is directed by the collection optics to the phosphor wheel 602. The yellow or green light emitted from the phosphor wheel 602 is collected by the optics 603 and partially reflected by the dichroic filter 604. The dichroic filter 604 is designed to substantially pass the excitation light and partially reflect the converted light emitted by the phosphor material. For example, the dichroic filter 604 may reflect light with wavelengths longer than 590 nm and transmits light with wavelengths shorter than 470 nm as well as light with wavelengths between 470 nm and 590 nm. The light reflected by the dichroic filter 604 is a red output light.

Those skilled in the art will understand that the transmission and reflection characteristics of the dichroic filter 604 may be reversed, i.e., it may transmit wavelengths longer than 590 nm and reflect wavelengths shorter than 470 nm as well as because 470 nm and 590 nm.

In an alternative embodiment, the dichroic filter 604 transmits all of the converted light from the phosphor wheel 602, and an additional filter (not shown) similar to filter 204 is disposed downstream from the dichroic filter 602 to generate a red output light.

Figure 8:
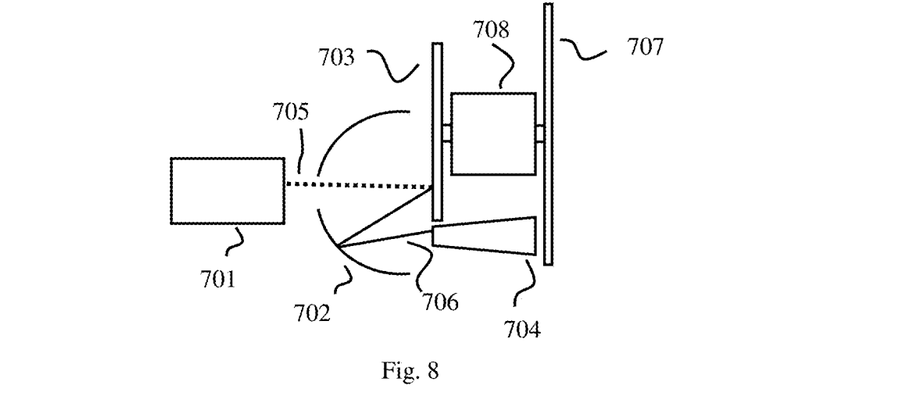
FIG. 8 shows a light source device according to another embodiment of the present invention.

A light source according to another embodiment of the present invention is shown in FIG. 8. This device is similar to that shown in FIG. 6, and like components are labeled with like symbols. The main difference between the devices of FIGS. 6 and 8 is that the color filter plate 707 in FIG. 8 is mechanically coupled to the motor 708 which drives the phosphor wheel 703, so when the motor 708 rotates, the phosphor wheel 703 and color filer plate 707 will rotate together. In FIG. 6, on the other hand, the color filter 507 is stationary.

Figure 9:
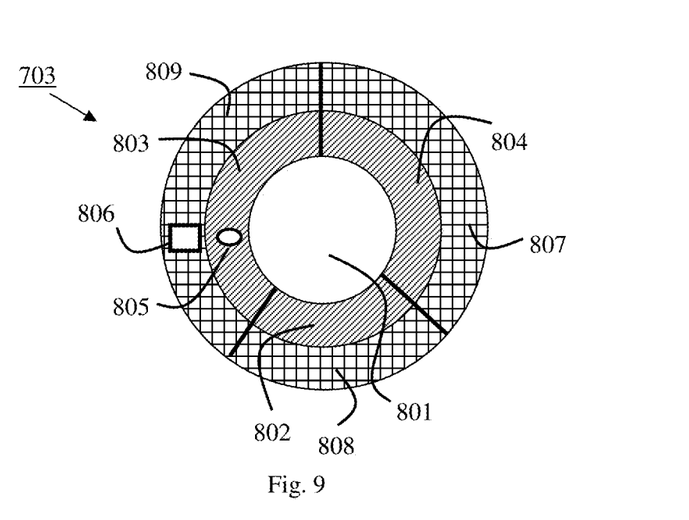
FIG. 9 shows a multiple segment phosphor wheel used in the light source device of FIG. 8.

FIG. 9 shows the front view of the phosphor wheel assembly 703/707 of FIG. 8, viewed along the direction of the excitation light 705. Both the phosphor wheel 703 and the filter plate 707 have more than one segment. Each phosphor segment has one corresponding color filter or transparent glass segment. When the motor rotates, the phosphor wheel will move, but the color filter moves together with it in synchrony. Because of the synchronized movements of the phosphor wheel assembly, each phosphor segment is always aligned with its color filter or transparent glass segment. The three segments of the phosphor layers 802, 803 and 804 are coated on the phosphor wheel's substrate 801. Segments 802, 803 and 804 have corresponding color filters or transparent glass 808, 809, and 807. A yellow phosphor is used on phosphor segment 803, and a corresponding red pass color filter is used as filter segment 809. When the excitation light spot 805 is located inside phosphor segment 803, the phosphor emission beam existing from the collection optics 704 forms a spot 806 on filter segment 809. The yellow emission light is filtered and a red light is generated. The other phosphor segments 802 and 804 may have green and blue phosphors, respectively, and the filter segments 808 and 807 may have appropriate filters or no filter. Therefore, this phosphor wheel assembly shown in FIG. 8 and FIG. 9 can generate multiple colored lights sequentially, which may be useful in a single DMD (digital micromirror devices) projector.

In FIGS. 8 and 9, the filter segments 807, 808 and 809 form a ring located on the outside of the phosphor segments 804, 802 and 803 which also form a ring. The two rings are concentric. The ring of filter segments may also be located on the inside of the ring of phosphor segments. Further, while three segments are shown for each of the phosphor wheel and the filter plate 707, other numbers of segments may be used.

Figure 10:
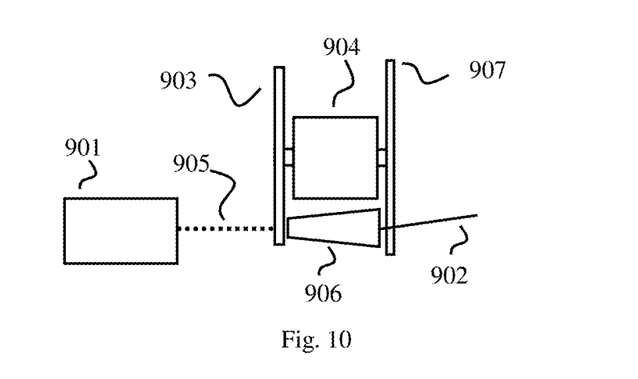
FIG. 10 shows a light source device according to another embodiment of the present invention.

A light source device according to another embodiment of the present invention is shown in FIG. 10, which is similar to the device shown in FIG. 8 but uses a transmissive type phosphor wheel 903. The excitation light source 901 is a blue or UV/near UV source. The excitation light 905 from the source 901 illuminates the phosphor wheel 903 and is converted to emission light by the phosphor material on the wheel. The phosphor emission light is collected by collection optics 906, which may be a tapered light tunnel, a tapered light rod, or a lens group. While the emission from the phosphor wheel 903 has a near Lambertian distribution, the emission light 902 outputted by the collection optics 906 has a smaller beam divergence such as +−30 degrees. Such small divergence angle is beneficial for a dichroic filter. A color filter plate 907 is mechanically coupled to the motor 904, so when the motor 904 rotates, the phosphor wheel 903 and color filer plate 907 rotate together. Both the phosphor wheel and the filter have more than one segment, for example, as shown in FIG. 9. Each phosphor segment on the phosphor wheel has one corresponding color filter or transparent glass segment on the filter plate 907. One of the phosphor segments carries a yellow phosphor and its corresponding color filter segment is able to reject green light and accept red light. When the motor 904 rotates, the phosphor wheel 903 will move, but the color filter plate 907 moves together with it. The synchronized movement of the phosphor wheel assembly generates multiple colored lights sequentially, including a red color light. The other colors may be green and blue, and appropriate phosphor materials and color filters can be used to achieve them.

Light source devices according to various embodiments of the present invention may be used to generate colored lights other than red. For example, a yellow phosphor whose emission has a dominant wavelength between 570 nm and 590 nm combined with an appropriate color filter may be used to generate a green or cyan colored light whose dominant wavelength is shorter than 570 nm. Further, other colored phosphors may be used to generate a red light. For example, a green phosphor whose emission has a dominant wavelength between 520 nm and 570 nm can be combined with an appropriate filter to generate a red light having a dominant wavelength longer than 590 nm.

Light source devices according to embodiments of the present invention are more energy efficient, less vulnerable to heat introduced problem, able to generate more stable colors, less susceptible to drooping, and more cost effective.

Light source devices according to embodiments of the present invention are useful in projector systems. The projector system may include the light source device, a spatial light modulator (SLM) for modulating the light from the light source device, and projection optics for projecting the modulated light. The SLM may be a single channel or multi-channel SLM.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A light source device, comprising:
   an excitation light source for generating an excitation light;
   a wavelength conversion device carrying a first wavelength conversion material which converts the excitation light into a first color light having longer wavelengths than the excitation light; and
   a filter plate having a first filter segment which filters the first color light to output a second color light, wherein the second color light is not incident upon the wavelength conversion device, wherein a difference between dominant wavelengths of the second color light and the first color light is more than 3 nm.

2. The light source device of claim 1, wherein the dominant wavelength of the first color light is between 520 nm and 590 nm, and the dominant wavelength of the second color light is longer than 590 nm.

3. The light source device of claim 2, wherein the first color light is green or yellow and the second color light is red.

4. The light source device of claim 1, wherein the dominant wavelength of the first color light is between 570 nm and 590 nm, and the dominant wavelength of the second color light is shorter than 570 nm.

5. The light source device of claim 4, wherein the first color light is yellow and the second color light is green or cyan.

6. The light source device of claim 1, wherein a light conversion efficiency of the first wavelength conversion material is greater than 15%.

7. The light source device of claim 1, wherein the difference between the dominant wavelengths of the second color light and the first color light is more than 10 nm.

8. The light source device of claim 1, further comprising:
   a drive device for moving the wavelength conversion device relative to the excitation light source, wherein an illumination spot of the excitation light moves on the first wavelength conversion material along a predetermined path.

9. The light source device of claim 8, wherein the wavelength conversion device and the filter plate are fixed relative to each other and are driven to move in synchrony by the drive device.

10. The light source device of claim 9, wherein the wavelength conversion material and the filter plate are both ring shaped and fixed on an axis of the drive device.

11. The light source device of claim 1, further comprising a drive device,
   wherein the wavelength conversion device includes at least first and second segments, the first segment carrying the first wavelength conversion material, the second segment either carrying a second wavelength conversion material or carrying a filter or being a clear segment to output a third color light, the third color light being either a converted light outputted by the second wavelength conversion material or a filtered excitation light outputted by the filter or the excitation light transmitted by the clear segment; and
   wherein the drive device moves the wavelength conversion device relative to the excitation light source and the excitation light illuminates the first and second segments sequentially.

12. The light source device of claim 11, wherein the wavelength conversion device and the filter plate are fixed relative to each other and are driven to move in synchrony by the drive device,
   wherein the filter plate has a second segment which either carries a filter or is a clear segment;
   wherein the first filter segment filters the first color light generated by the first wavelength conversion material, and
   wherein the second segment of the filter plate filters or transmits the third color light outputted by the second segment of the wavelength conversion device.

13. The light source device of claim 1, wherein the wavelength conversion device reflects or transmits the first color light.

14. The light source device of claim 1, wherein the wavelength conversion device reflects the first color light,
   the light source device further comprising a spherical or ellipsoidal reflector having a reflective inside surface and an aperture at its top, disposed to reflect the first light from the wavelength conversion device to the filter plate.

15. The light source device of claim 14, wherein the excitation light enters the reflector through the aperture to illuminate the wavelength conversion device.

16. The light source device of claim 1, wherein the wavelength conversion device reflects the first color light, and wherein the filter plate is a dichroic filter disposed between the wavelength conversion device and the excitation light source, which either reflects the second color light and transmits both the excitation light and other color components of the first color light, or transmits the second color light and reflects both the excitation light and the other color components of the first color light.

17. The light source device of claim 1, further comprising collection optics disposed between the wavelength conversion device and the filter plate to reduce a divergent angle of the first color light.

18. The light source device of claim 17, wherein the collection optics includes a lens or a tapered light tunnel or tapered light rod.

19. A light source system comprising the light source device of claim 1, further comprising:
   a second light source device; and
   a color combiner for combining an output of the second light source device with the second color light.

20. A projector system comprising the light source device of claim 1, further comprising:
   a spatial light modulator for modulating the light from the light source device; and
   projection optics for projecting the modulated light.

* * * * *